US010042452B2

(12) United States Patent
Lin et al.

(10) Patent No.: US 10,042,452 B2
(45) Date of Patent: Aug. 7, 2018

(54) TOUCH SENSOR DEVICE AND METHOD FOR FORMING THE SAME

(71) Applicant: InnoLux Corporation, Miao-Li County (TW)

(72) Inventors: Ju-Ling Lin, Miao-Li County (TW); Hsi-Chien Chen, Miao-Li County (TW); Chia-Hsiung Chang, Miao-Li County (TW); Yang-Chen Chen, Miao-Li County (TW)

(73) Assignee: INNOLUX CORPORATION, Miao-Li County (TW)

(*) Notice: Subject to any disclaimer, the term of this patent is extended or adjusted under 35 U.S.C. 154(b) by 154 days.

(21) Appl. No.: 14/985,914

(22) Filed: Dec. 31, 2015

(65) Prior Publication Data

US 2016/0195987 A1 Jul. 7, 2016

(30) Foreign Application Priority Data

Jan. 7, 2015 (TW) .............................. 104100367 A (51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04103* (2013.01); *G06F 2203/04111* (2013.01)

(58) Field of Classification Search
CPC .................. G06F 3/0412; G06F 3/044; G06F 2203/04111; G06F 2203/04103
See application file for complete search history.

(56) References Cited

U.S. PATENT DOCUMENTS

2014/0293162 A1* 10/2014 Park .................. G02F 1/133502
349/12
2015/0130760 A1* 5/2015 Kim ........................ G06F 3/044
345/174

(Continued)

FOREIGN PATENT DOCUMENTS

| CN | 102830841 A | 12/2012 |
| CN | 104102377 A | 10/2014 |
| TW | M493109 U | 1/2015 |

OTHER PUBLICATIONS

Chinese language office action dated Feb. 13, 2017, issued in application No. TW 104100367.

(Continued)

*Primary Examiner* — Jonathan Boyd
(74) *Attorney, Agent, or Firm* — McClure, Qualey & Rodack, LLP (57) ABSTRACT

A touch sensor device is provided. The touch sensor device includes a substrate having a sensing region and a non-sensing region. There is a plurality of sensor electrodes disposed on the surface of the substrate in the sensing region. At least one of the sensor electrodes has a sidewall with a concave-convex contour. The concave-convex contour includes a first convex portion, a second convex portion, and a concave portion between the first convex portion and the second convex portion. The first convex portion is closer to the surface of the substrate than the second convex portion, and the first convex portion is more outward than the second convex portion. A method for forming the touch sensor device is also provided.

8 Claims, 8 Drawing Sheets

(56) References Cited

U.S. PATENT DOCUMENTS

2015/0169109 A1* 6/2015 Park .................. G06F 3/044
                                                    345/174
2015/0177882 A1* 6/2015 Kim .................. G06F 3/044
                                                    345/174

OTHER PUBLICATIONS

Chinese language office action dated Mar. 23, 2018, issued in application No. CN 201510006297.7.

* cited by examiner

TOUCH SENSOR DEVICE AND METHOD FOR FORMING THE SAME

CROSS REFERENCE TO RELATED APPLICATIONS

This Application claims priority of Taiwan Patent Application No. 104100367, filed on Jan. 7, 2015, the entirety of which is incorporated by reference herein.

BACKGROUND

Field of the Disclosure

The disclosure relates to a touch panel display technology, and in particular to a touch sensor device for a touch panel display and a method for fabricating the same.

Description of the Related Art

A touch sensor device is typically integrated with a flat panel display device, such as a liquid-crystal display (LCD), active matrix organic light-emitting display (AMOLED) or the like to form a touch panel display. Touch panel displays are typically mounted on electronic devices, such as portable personal computers, personal digital assistants (PDAs), electronic books, projectors, mobile phones, and the like. A touch panel display is capable of conducting functions input by a finger, a stylus, a pen, or the like.

A structure of the touch sensor device typically includes sense electrodes arranged in different directions (e.g., X-electrodes and Y-electrodes), insulating layers for electrical isolation between X-electrodes and Y-electrodes, and metal bridges for electrical connection between adjacent X-electrodes or between adjacent Y-electrodes. In the current method of fabrication of touch sensor devices, such sensor electrodes, insulating layers, and metal bridges are formed by respective lithography and etching processes, resulting in complicated fabrication and high manufacture costs. Moreover, the sidewall contours of the sensor electrodes formed by lithography and etching processes are smooth, so that the sensor electrodes can be seen with the human eye. Accordingly, there exists a need in the art for development of a novel touch sensor device, and a method for fabricating the same, capable of lowering manufacturing costs, simplifying fabrication, and reducing the visibility of sense electrodes.

SUMMARY

An exemplary embodiment of a touch sensor device includes a substrate having a sensing region and a non-sensing region. A plurality of sensor electrodes is disposed on a surface of the substrate in the sensing region. At least one of the plurality of sensor electrodes has a sidewall with a concave-convex contour. The concave-convex contour includes a first convex portion, a second convex portion, and a concave portion between the first convex portion and the second convex portion. The first convex portion is closer to the surface of the substrate than the second convex portion, and the first convex portion is more outward than the second convex portion.

Another exemplary embodiment of a method for forming a touch sensor device includes providing a substrate having a sensing region and a non-sensing region. A first deposition process using a shadow mask is performed, to form a first sensing layer on the sensing region of the substrate. The shadow mask is shifted. A second deposition process using the shadow mask is performed, to form a second sensing layer on the substrate and the first sensing layer, so that a sidewall of the first sensing layer is not aligned with that of the second sensing layer on the same side of the first sensing layer and the second sensing layer.

BRIEF DESCRIPTION OF DRAWINGS

The disclosure can be more fully understood by reading the subsequent detailed description and examples with references made to the accompanying drawings, wherein.

DETAILED DESCRIPTION

The following description encompasses the fabrication process and the purpose of the disclosure. It should be understood that this description is provided for the purpose of illustrating the fabrication process and the use of the disclosure and should not be taken in a limiting sense. In the drawings or disclosure, the same or similar elements are represented or labeled by the same or similar symbols. Moreover, the shapes or thicknesses of the elements shown in the drawings may be magnified for simplicity and convenience. Additionally, common elements which are well known in the art are not shown or described in the drawings or disclosure.

Figure 1A:
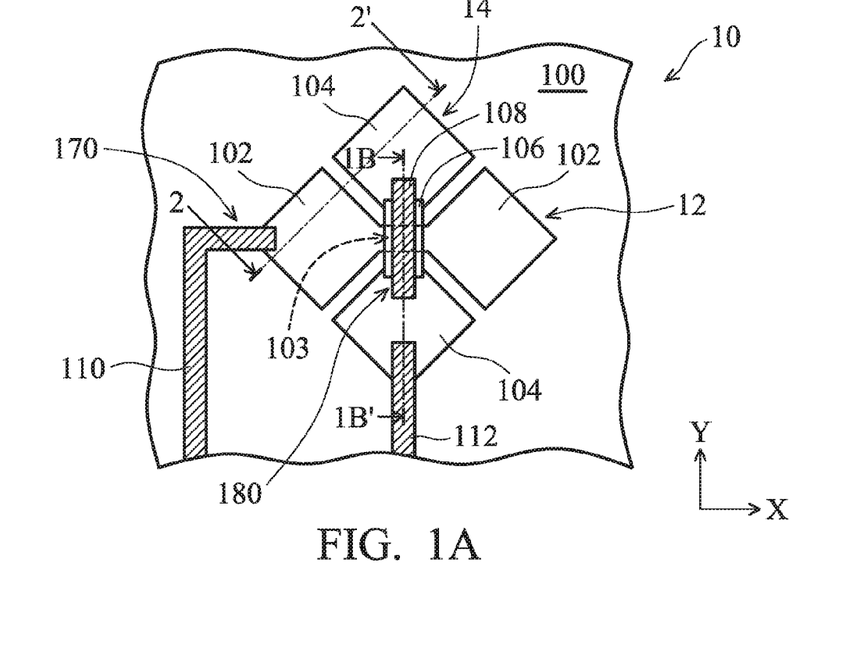
FIG. 1A is a plan view of a touch sensor module according to an exemplary embodiment.
Figure 1B:
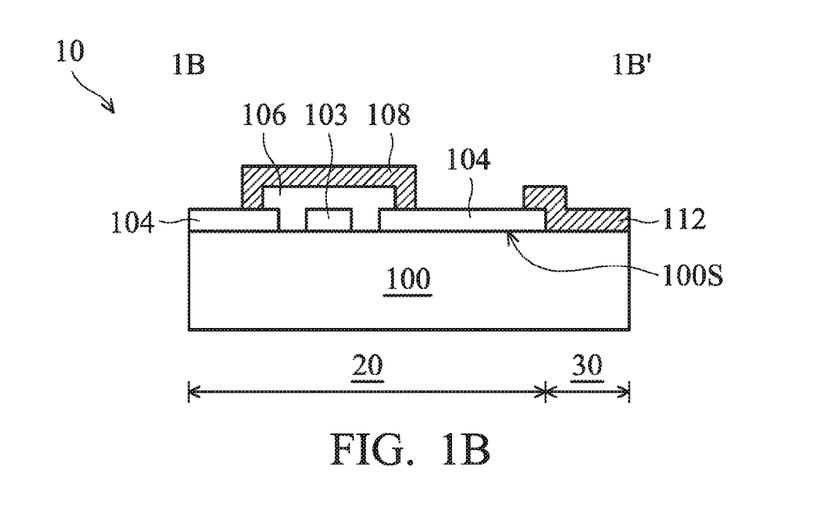
FIG. 1B is a cross section along line 1B-1B' shown in FIG. 1A.

Referring to FIGS. 1A and 1B, FIG. 1A is a plan view of a touch sensor module according to an exemplary embodiment, and FIG. 1B is a cross section along line 1B-1B' shown in FIG. 1A. In the embodiment, the touch sensor module 10 can be implemented in a touch sensor device. The touch sensor module 10 includes a substrate 100 having a sensing region 20 and a non-sensing region 30. The sensing region 20 is typically in a central region of the substrate 100, and the non-sensing region 30 is in the peripheral region of the substrate 100 and surrounds the sensing region 20. The substrate 100 may be formed of a transparent material, such as glass, quartz, or plastic, and serves as a carrier substrate for sensor electrodes.

Figure 3A:
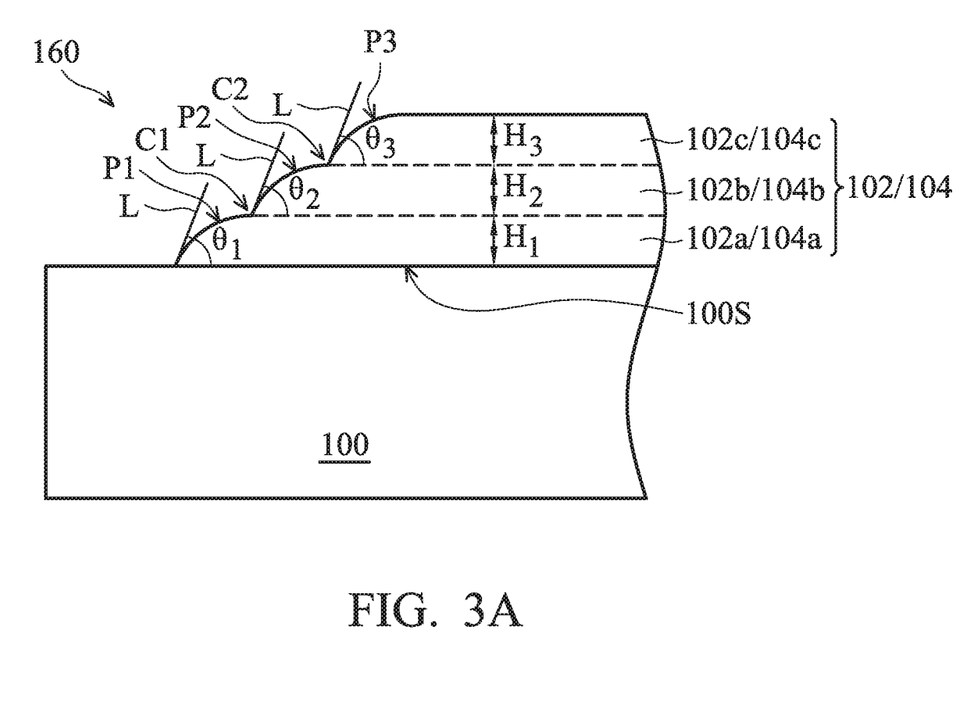
FIG. 3A is a partially enlarged diagram of a sensor electrode shown in FIG. 1A.

In FIGS. 1A and 1B, pluralities of first and second sensor electrodes 102 and 104 are disposed on a surface 100S of the substrate 100 corresponding to the sensing region 20. Referring to FIG. 3A, which is a partially enlarged diagram of a first sensor electrode 102 or a second sensor electrode 104. Referring to FIGS. 1A and 3A collectively, in the embodiment, at least one of the first sensor electrode 102 and the second sensor electrode 104 has at least one sidewall 160 with a concave-convex contour. In one embodiment, the concave-convex contour has a first convex portion P1, a second convex portion P2, a third convex portion P3, and concave portions C1 and C2, in which the concave portion C1 is between the first convex portion P1 and the second convex portion P2, and the concave portion C2 is between the second convex portion P2 and the third convex portion P3. The first convex portion P1 is closer to the surface 100S of the substrate 100 than the second convex portion P2, and the second convex portion P2 is closer to the surface 100S of the substrate 100 than the third convex portion P3. Moreover, the first convex portion P1 is more outward than the second convex portion P2, and the second convex portion P2 is more outward than the third convex portion P3. In some embodiments, the concave-convex contour has a first convex portion P1, a second convex portion P2, and a concave portion C1.

Referring to FIGS. 1A and 1B, for example, the sensor electrodes includes a first group of sensor electrodes 12 and a second group of sensor electrodes 14. The first group of sensor electrodes 12 includes a plurality of first sensor electrodes 102 (two electrodes are shown in FIG. 1A), in which the plurality of first sensor electrodes 102 is extended and arranged along a first direction (e.g., the X-direction indicated in FIG. 1A). The second group of sensor electrodes 14 includes a plurality of second sensor electrodes 104 (two electrodes are shown in FIG. 1A), in which the plurality of second sensor electrodes 104 is extended and arranged along a second direction. The second direction may be the same as or different from the first direction. In the embodiment, the second direction is different from the first direction and is indicated as the Y-direction in FIG. 1A. For example, the second direction may be perpendicular to the first direction.

In the embodiment, different first groups of sensor electrodes 12 are arranged along the second direction (i.e., the Y-direction indicated in FIG. 1A) to form a plurality of first groups of sensor electrodes 12. In order to simplify the diagram, only one first group of sensor electrodes 12 is depicted. Different second groups of sensor electrodes 14 are arranged along the first direction (i.e., the X-direction indicated in FIG. 1A) to form a plurality of second groups of sensor electrodes 14. In order to simplify the diagram, only one second group of sensor electrodes 14 is depicted.

The arranged directions of the embodiments of the present disclosure are exemplary, and the invention is not limited thereto. Moreover, the sensor electrodes of the disclosure can be implemented to mutual-capacitance touch sensor devices, self-capacitance touch sensor devices, or resistive-type touch sensor devices, and the invention is not limited thereto.

The first sensor electrode 102 and the second sensor electrode 104 may be formed of a transparent conductive pattern layer, such as an indium tin oxide (ITO) or indium zinc oxide (IZO) pattern layer.

In the embodiment, the surface of at least one of the first sensor electrode 102 and the second sensor electrode 104 has a recess. Moreover, at least one of the first sensor electrode 102 and the second sensor electrode 104 has at least one sidewall with concave-convex contour.

The first sensor electrode 102 and the second sensor electrode 104 can be formed in a single process. Alternatively, the first sensor electrode 102 and the second sensor electrode 104 can be formed in multiple processes. In one embodiment, the first sensor electrode 102 and the second sensor electrode 104 is formed using three processes. Referring to FIG. 3A, the first sensor electrode 102 or the second sensor electrode 104 includes a first sensing layer 102a or 104a, a second sensing layer 102b or 104b disposed on and non-aligned to the first sensing layer 102a or 104a, and a third sensing layer 102c or 104c disposed on and non-aligned to both of the first sensing layer 102a or 104a and the second sensing layer 102b or 104b. In order to simplify the diagram, only the first sensor electrode 102 is used in an exemplary description.

In the embodiment, at the same side of the first sensing layer 102a, the second sensing layer 102b, and the third sensing layer 102c of the first sensor electrode 102, the respective sidewalls thereof are not aligned to each other, such that the first sensor electrode 102 has a sidewall with the concave-convex contour as mentioned above, for example, a multi-step contour. In one embodiment, the lateral distance between the adjacent steps is in a range of about 2 μm to 10 μm, for example, 3 μm to 8 μm. Moreover, the first sensing layer 102a, the second sensing layer 102b, and the third sensing layer 102c of the first sensor electrode 102 respectively have heights H1, H2, and H3. In one embodiment, the first sensing layer 102a, the second sensing layer 102b, and the third sensing layer 102c have the same height (i.e., H1=H2=H3). In some embodiments, at least two sensing layers that are adjacent to each other have different heights (i.e., H1≠12 and/or H2≠H3).

Moreover, the respective tangents L corresponding to the bottoms of the first sensing layer 102a, the second sensing layer 102b, and the third sensing layer 102c have angles θ1, θ2, and θ3 with respect to a horizontal surface (e.g., the surface 100S of the substrate 100). The sensing layers 102a, 102b, and 102c may have the same angle (i.e., θ1=θ2=θ3). Alternatively, the sensing layers 102a, 102b, and 102c may have different angles, depending on demand. Additionally, in order to increase the light scattering on the sidewall of the first sensor electrode 102, too-large angles θ1, θ2, and θ3 may be not appropriate. In the embodiment, angles θ1, θ2, and θ3 are in a range of about 8° to 25°, for example, 11° to 20°. As a result, the visibility of the edges of the first sensor electrode 102 can be reduced by increasing the light scattering. It is to be understood that FIG. 3A is used for an exemplary description. In some embodiments, the sidewall of the first sensor electrode may have two- or more than three-step contours.

Still referring to FIGS. 1A and 1B, in the embodiment, the touch sensor module 10 further includes pluralities of traces 110 and 112, a plurality of bridge layers 108 and a plurality of insulating islands 106. The pluralities of traces 110 and 112 are disposed on the non-sensing region 20 of the substrate 100, in which the plurality of traces 110 electrically connects the first sensor electrodes 102 of the first group of the sensor electrodes 12 to an exterior circuit (not shown), and the plurality of traces 112 electrically connects the second sensor electrodes 104 of the second group of the sensor electrodes 14 to the exterior circuit. The pluralities of traces 110 and 112 may be comprised of metal and may be a single-layered or multi-layered metal structure. For example, the pluralities of traces 110 and 112 may be comprised of aluminum, gold, molybdenum, chromium, tin, zirconium, aluminum alloy, gold alloy, molybdenum alloy, chromium alloy, tin alloy, zirconium alloy, or a combination thereof.

Figure 3B:
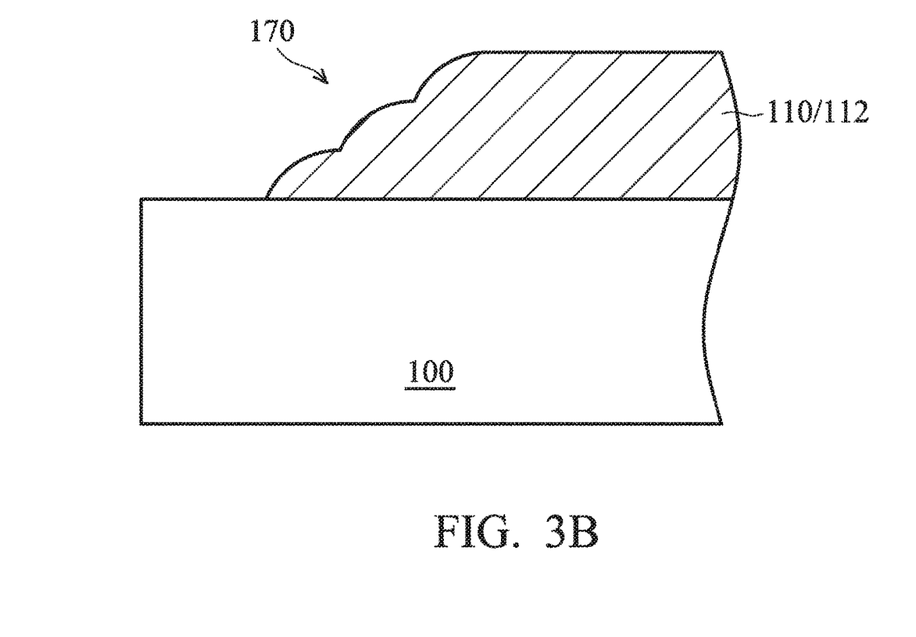
FIG. 3B is a partially enlarged diagram of a trace shown in FIG. 1A.

In one embodiment, at least a sidewall of the plurality of traces 110 or 112 has a concave-convex contour. For example, referring to FIG. 3B, which illustrates a partially enlarged diagram of a trace 110 or 112 shown in FIG. 1A. Similar to the first sensor electrode 102, the traces 110 and 112 have at least one sidewall 170 with a concave-convex contour, such as a multi-step contour. The specific structure of the concave-convex contour of the plurality of traces 110 or 112 is similar to that of the sensor electrodes mentioned above and is not described again for brevity.

The bridge layer 108 may connect the adjacent first sensor electrodes 102 or connect the adjacent second sensor electrodes 104. In the embodiment, the bridge layer 108 connects the adjacent second sensor electrodes 104, and the adjacent first sensor electrodes 102 are electrically connected to each other by a connecting portion 103 formed therebetween. The plurality of insulating islands 106 is correspondingly disposed under the plurality of bridge layers 108 and each insulating island 106 crosses the corresponding connecting portion 103, thereby electrically isolating the first sensor electrode 102 and the second sensor electrode 104. The bridge layer 108 may be comprised of metal, but it is not limited thereto. For example, the bridge layer 108 may be a single-layered or multi-layered metal structure and may be comprised of aluminum, gold, molybdenum, chromium, tin, zirconium, aluminum alloy, gold alloy, molybdenum alloy, chromium alloy, tin alloy, zirconium alloy, or a combination thereof.

In one embodiment, the insulating island 106 and the bridge layer 108 have at least a sidewall with a concave-convex contour. For example, the insulating island 106 and the bridge layer 108 have at least a sidewall with a multi-step contour. The specific structure of the concave-convex contour of the insulating island 106 and the bridge layer 108 is similar to that of the sensor electrodes mentioned above and is not described again for brevity. The concave-convex contour of the insulating island 106 and the bridge layer 108 may be similar to that shown in FIGS. 3A and 3B.

Figure 5:
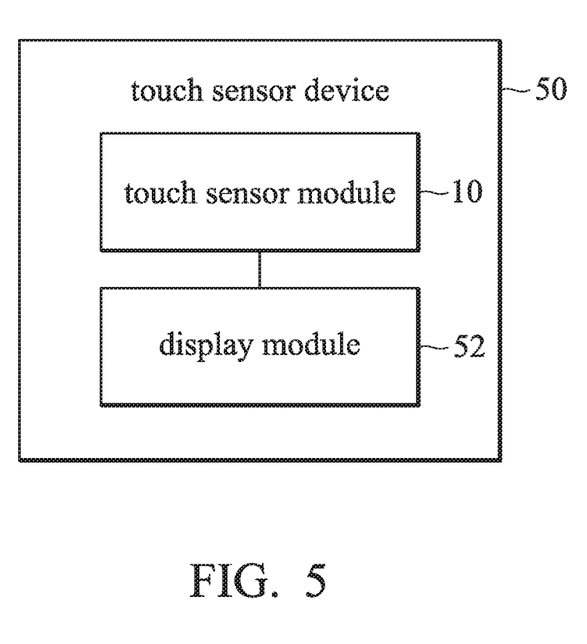
FIG. 5 is a block diagram of a touch sensor device according to an exemplary embodiment.

Referring to FIG. 5, which illustrates a block diagram of a touch sensor device 50 according to an exemplary embodiment. In the embodiment, the touch sensor device 50 may include the touch sensor module 10 mentioned above and a display module 52. The touch sensor module provides the touch sensor device 50 with the functions of a touch sensor, and the display module 52 provides the touch sensor device 50 with the functions of a display. In one embodiment, the touch sensor module 10 is used for an out-cell touch sensor device. In this case, the substrate 100 of the touch sensor module 10 may be a cover plate of the touch sensor device 50 to protect the sensor electrodes of the touch sensor module 10. In another embodiment, the touch sensor module 10 is used for a touch on display (TOD). In this case, the substrate 100 of the touch sensor module 10 and one of the substrates of the display module 52 are the same substrate. For example, the substrate 100 is a color filter (CF) substrate of the display module 52, and the sensor electrodes are disposed on the outside of the CF substrate. In yet another embodiment, the touch sensor module 10 is used for an in-cell touch sensor device. In this case, the substrate 100 of the touch sensor module 10 and one of the substrates of the display module 52 are the same substrate. For example, the sensor electrodes are disposed on inner side of the array substrate or CF substrate of the display module 52.

Figure 2A:
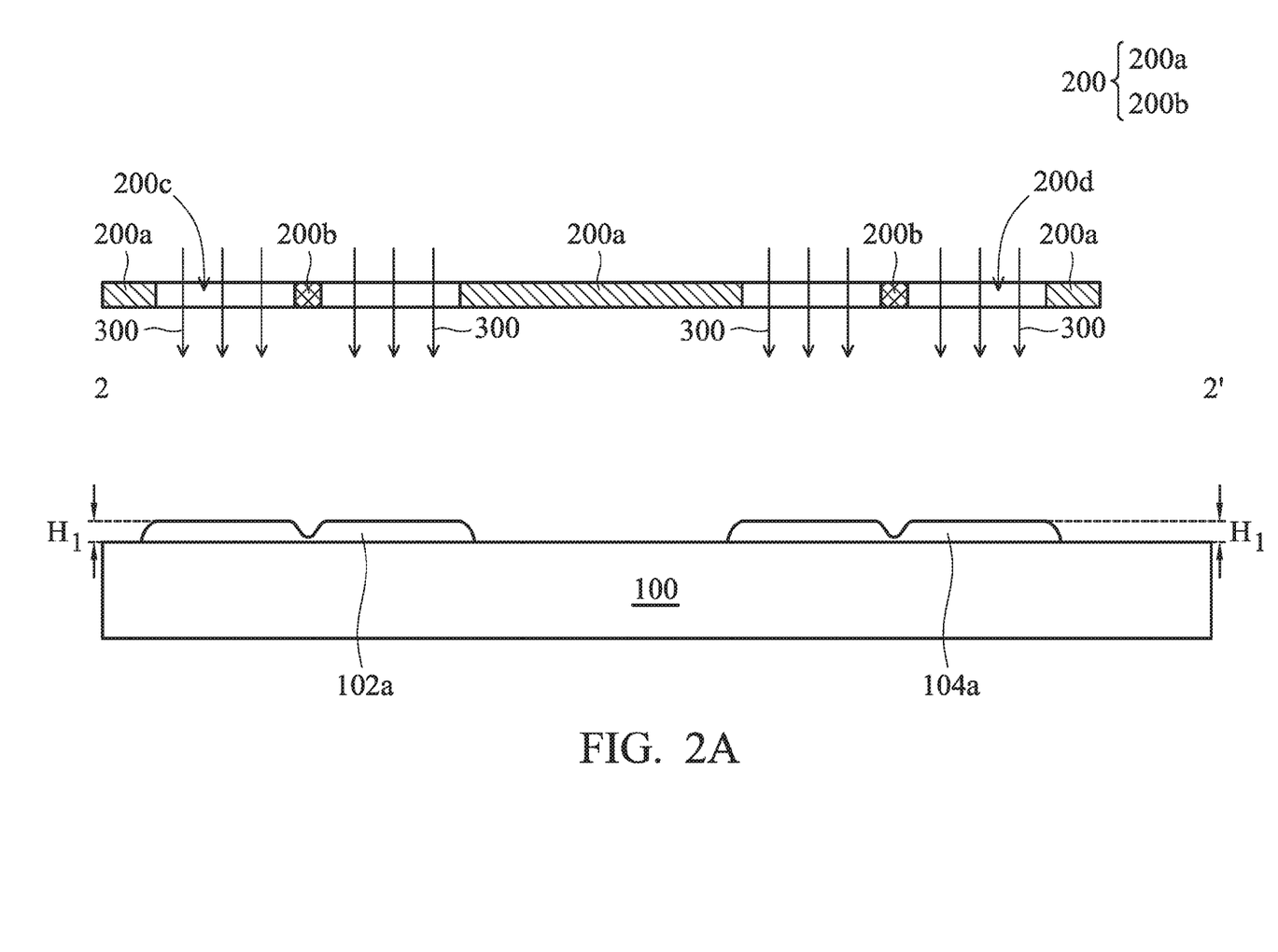
FIGS. 2A-2C are cross sections along line 2-2' shown in FIG. 1A and show a method for forming sensor electrodes according to an exemplary embodiment.
Figure 2B:
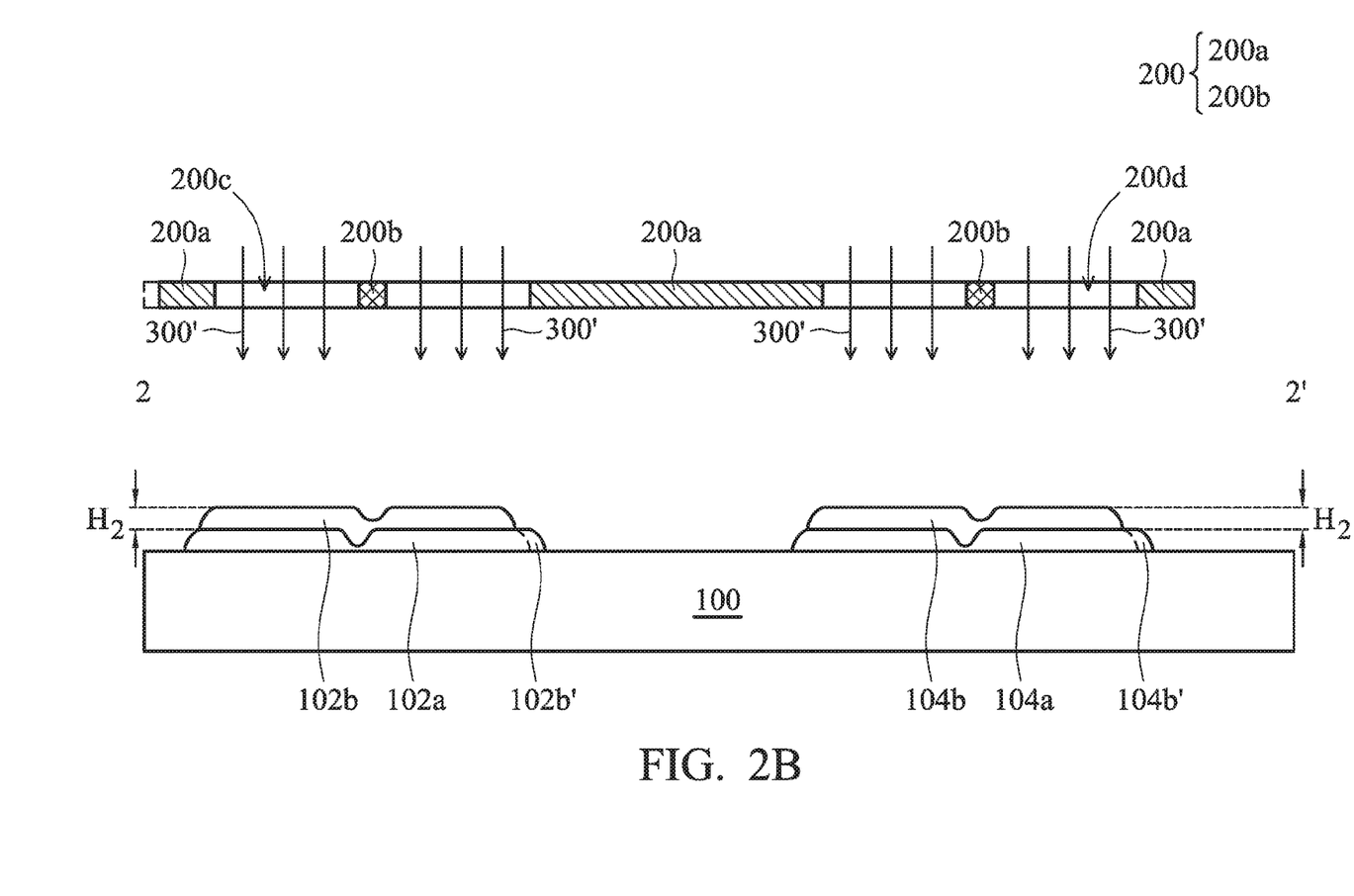
Figure 2C:
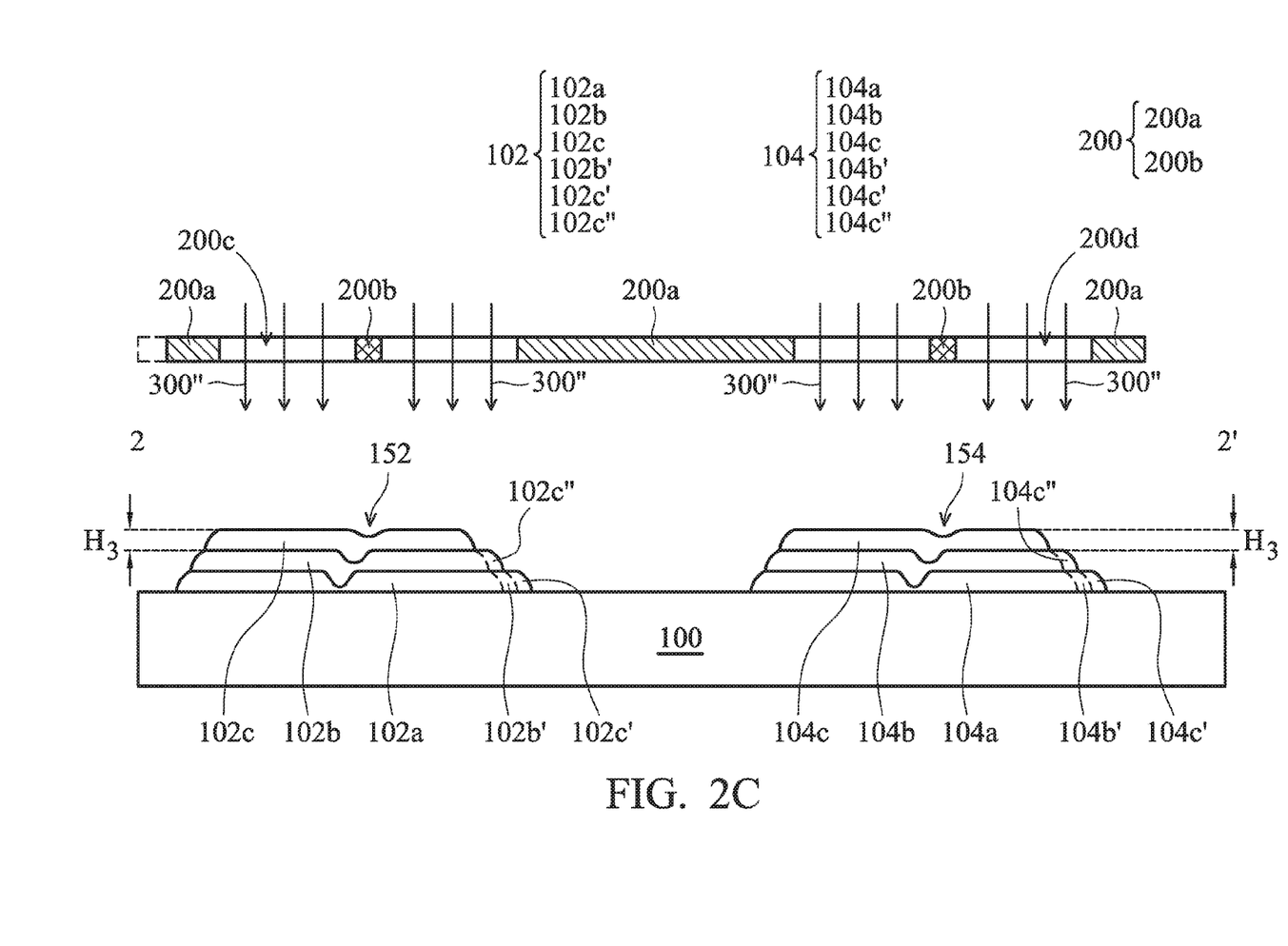

The method for forming a touch sensor device according to an exemplary embodiment will be described referring to FIGS. 1A-1B and 2A-2C. FIGS. 2A-2C are cross sections along line 2-2' shown in FIG. 1A and show a method for forming sensor electrodes according to an exemplary embodiment. The following method is one of the methods for forming the sensor electrode according to an exemplary embodiment, and the invention is not limited thereto.

First, a substrate 100 (as shown in FIG. 2A) is provided. The substrate 100 has a sensing region 20 and a non-sensing region 30 (as shown in FIG. 1B). Next, a plurality of first sensor electrode 102 and a plurality of second sensor electrodes 104 are formed on the sensing region 20 (indicated in FIG. 1B) of the substrate 100 using a shadow mask. In order to simplify the description, only a single first sensor electrode 102 and a single second sensor electrode 104 are depicted.

For example, referring to FIG. 2A, a shadow mask 200 is provided. The shadow mask 200 includes an opening pattern 200c corresponding to the first sensor electrode 102 and an opening pattern 200d corresponding to the second sensor electrode 104. In one embodiment, the shadow mask 200 includes a flexible substrate 200a and metal strips 200b arranged in parallel and disposed in the flexible substrate 200a. The metal strips 200b act as a support material for the flexible substrate 200a. In the embodiment, the opening patterns 200c and 200d may expose at least one of metal strips 200b.

Next, deposition is performed using the shadow mask 200, thereby forming sensor electrodes on the substrate 100. In the embodiment, the deposition for the sensor electrodes may be chemical vapor deposition (CVD) or physical vapor deposition (PVD). For example, the deposition for the sensor electrodes may be a sputtering process, but it is not limited thereto. Since the opening patterns 200c and 200d may expose the metal strip 200b, a recess may be formed on the surface of the sensor electrode on the substrate 100 and correspond to the exposed metal strip 200b. As a result, non-uniform thickness of the sensor electrode is formed, thereby causing poor electrical properties. In order to eliminate or mitigate such a problem, in the embodiments of the present invention, multiple deposition processes are employed.

For example, a first deposition process 300 is performed using the shadow mask 200 to form first sensing layers 102a and 104a with the same height H1 on the sensing region 20 of the substrate 100. After performing the first deposition process 300, the first sensing layers 102a and 104a have a recess formed on the surface thereof due to the metal strips 200b exposed from the opening patterns 200c and 200d of the shadow mask.

Next, after the shadow mask 200 is shifted, a second deposition process 300' that is the same as the first deposition process 300 is performed. For example, as shown in FIG. 2B, the shadow mask 200 is shifted to a distance along a direction that is parallel to the first direction, thereby forming second sensing layers 102b and 104b with the same height H2 respectively on the first sensing layers 102a and 104a, such that at the same side of the first sensing layers 102a and the second sensing layers 102b, the sidewall of the first sensing layer 102a is not aligned to that of the second sensing layer 102b. Similarly, at the same side of the first sensing layers 104a and the second sensing layers 104b, the sidewall of the first sensing layer 104a is not aligned to that of the second sensing layer 102b. The shifted distance of the shadow mask 200 may be in a range of 2 μm to 10 μm, for example, 3 μm to 8 μm. At the same time, since the shift of the shadow mask 200, portions of the second sensing layers 102b and 104b (which are respectively labeled by 102b' and 104b') are formed on the substrate 100 and respectively on the sidewalls of the first sensing layers 102a and 104a. Moreover, since the second sensing layers 102b and 104b are shifted with respect to the first sensing layers 102a and 104a, other portions of the second sensing layers 102b and 104b respectively fill the recesses formed on the surface of the first sensing layers 102a and 104a.

Next, referring to FIG. 2C, after the shadow mask 200 is shifted to a distance along a direction that is parallel to the first direction, a third deposition process 300" that is the same as the first deposition process 300 is performed, thereby forming third sensing layers 102c and 104c with the same height H3 respectively on the second sensing layers 102*b* and 104*b*, such that at the same side of the second sensing layer 102*b* and the third sensing layers 102*c*, the sidewall of the second sensing layer 102*b* is not aligned to that of the third sensing layer 102*c*. Similarly, at the same side of the second sensing layer 104*b* and the third sensing layers 104*c*, the sidewall of the second sensing layer 104*b* is not aligned to that of the third sensing layer 104*c*. At the same time, since the shift of the shadow mask 200, portions of the third sensing layers 102*c* and 104*c* (which are respectively labeled by 102*c'* and 104*c'*) are formed on the substrate 100 and respectively on the sidewalls of the second sensing layers 102*b'* and 104*b'*. Moreover, other portions of third sensing layers 102*c* and 104*c* (which are respectively labeled by 102*c"* and 104*c"*) are formed respectively on the sidewalls of the second sensing layers 102*b* and 104*b*. As a result, the fabrication of the first sensor electrode 102 and the second sensor electrode 104 is completed. In the embodiment, the first sensor electrode 102 includes the first sensing layer 102*a*, the second sensing layers 102*b* and 102*b'*, and the third sensing layers 102*c*, 102*c'*, and 102*c"*. Moreover, the second sensor electrode 104 includes the first sensing layer 104*a*, the second sensing layers 104*b* and 104*b'*, and the third sensing layers 104*c*, 104*c'*, and 104*c"*. Similarly, since the third sensing layers 102*c* and 104*c* are shifted with respect to the second sensing layers 102*b* and 104*b*, yet other portions of the third sensing layers 102*c* and 104*c* respectively fill the recesses formed on the surface of the second sensing layers 102*b* and 104*b*. As a result, the depths of the recesses formed on the surface of the first sensor electrode 102 and the second sensor electrode 104 can be effectively reduced, thereby preventing the electrical properties of the sensor electrodes from being reduced. As shown in FIG. 2C, in the embodiment, the surface of the first sensor electrode 102 may have a recess 152, and the surface of the second sensor electrode 104 may have a recess 154. For example, the ratio of the depth of the recess formed on the surface of the sensor electrode to the thickness of the sensor electrode without forming the recess is in a range of 6% to 75%. In one embodiment, the ratio is in a range of 46% to 71%. For example, when the thickness of the first sensing electrode 102 (i.e., the total thickness of the first, second and third sensing layers 102*a*, 102*b*, and 102*c*) is 1500 μm, the depth of the recess 152 is in a range of 100 μm to 1100 μm or in a range of 700 μm to 1070 μm, but is not limited thereto.

Additionally, since the second sensing layers 102*b* and 104*b* are shifted with respect to the first sensing layers 102*a* and 104*a*, and since the third sensing layers 102*c* and 104*c* are shifted with respect to the second sensing layers 102*b* and 104*b*, the first sensor electrode 102 and the second sensor electrode 104 have at least a sidewall with a concave-convex contour, such as a multi-step contour. The light scattering on the sidewalls of the first sensor electrode 102 and the second sensor electrode 104 can be increased by the multi-step contour, so as to reduce the visibility of the first sensor electrode 102 and the second sensor electrode 104.

It is to be understood that the FIGS. 2A-2C are used for an exemplary description. The shadow mask 200 may be shifted once, twice, or more than twice.

Next, insulating islands 106 and bridge layers 108 are successively formed on the sensing region 20 of the substrate 100, and traces 110 and 112 are formed on the non-sensing region 30 of the substrate 100 by conventional deposition, lithography and etching processes, to form a touch sensor module 10, as shown in FIGS. 1A-1B. In some embodiments, the insulating islands 106, the bridge layers 108, and the traces 110 and 112 may be formed by multiple deposition processes using the shadow mask according to the embodiments mentioned above. As a result, the insulating islands 106 have at least a sidewall with a concave-convex contour, the bridge layers 108 have at least a sidewall with a concave-convex contour, or the traces 110 and 112 have at least a sidewall with a concave-convex contour. Moreover, based on the demands, all of the sensor electrodes, the insulating islands, the bridge layers, and the traces have a sidewall with a concave-convex contour.

Similarly, the surfaces of the insulating island 106, the bridge layer 108, and the traces 110 and 112 can have a recess formed thereon. The properties of the recesses are similar to the recess 152 of the first sensor electrode 102. The ratio of the depth of the recess formed on the surface of the insulating island 106, the bridge layer 108, or the traces 110 and 112 to the thickness of the insulating island 106, the bridge layer 108, or the traces 110 and 112 without forming the recess is in a range of 6% to 75%. In one embodiment, the ratio is in a range of 46% to 71%. It is not described again for brevity.

In the embodiment, the deposition processes for the insulating islands, the bridge layers, and the traces may be performed by CVD or PVD. For example, CVD can be used for the insulating islands, and the sputtering process can be used for the bridge layers and the traces. However, the invention is not limited thereto.

In an example, referring to FIG. 1A, the trace 110 is formed by the method mentioned above. The shadow mask is shifted along a second direction (e.g., the Y-direction) in the two deposition processes. As a result, the sidewall 170 of the formed trace 110 can have the concave-convex contour mentioned above. In another example, referring to FIG. 1A, the bridge layer 108 is formed by the method mentioned above. The shadow mask is shifted along a first direction (e.g., the X-direction) in the two deposition processes. As a result, the sidewall 180 of the formed bridge layer 108 can have the concave-convex contour mentioned above.

Figure 4A:
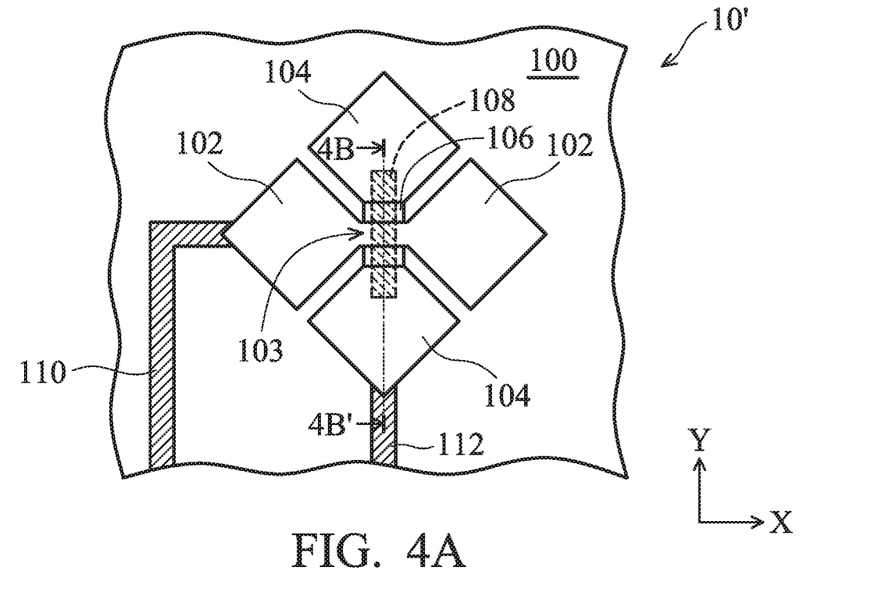
FIG. 4A is a plan view of a touch sensor module according to another exemplary embodiment.
Figure 4B:
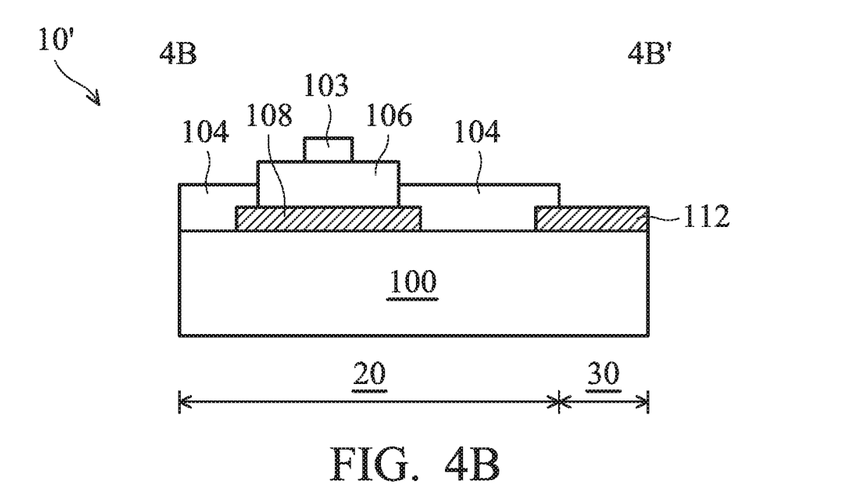
FIG. 4B is a cross section along line 4B-4B' shown in FIG. 4A.

Referring to FIGS. 4A-4B, FIG. 4A is a plan view of a touch sensor module 10' according to another exemplary embodiment, and FIG. 4B is a cross section along line 4B-4B' shown in FIG. 4A. The elements in FIGS. 4A-4B that are the same as those in FIGS. 1A-1B are labeled with the same reference numbers as in FIGS. 1A-1B and are not described again for brevity. In the embodiment, the structure of the touch sensor module 10' is similar to the touch sensor module 10 shown in FIGS. 1A-1B. The difference is the insulating island 106 covers the bridge layer 108 that is electrically connected to adjacent second sensor electrodes 104. Moreover, a connecting portion 103 crosses the insulating island 106 to be electrically connected to adjacent first sensor electrodes 102. The touch sensor module 10' can be formed by the processes that are similar to that for forming the touch sensor module 10, such that at least one sidewall of the first and second sensor electrodes 102 and 104, the insulating island 106, the bridge layer 108, and the traces 110 and 112 can have a concave-convex contour.

According to the foregoing embodiments, since the touch sensor electrode of some embodiments of the present invention is formed by multiple deposition processes with shifting a shadow mask, the depth of the recess formed on the surface of the sensor electrode can be reduced, thereby maintaining the electrical properties of the sensor electrode. Moreover, compared to the sensor electrode with a smooth sidewall that is formed by conventional lithography and etching processes, the sensor electrode with a concave-convex contour according to the embodiments can improve light scattering, thereby reducing the visibility of the sensor electrode. Similarly, the sidewalls with concave-convex contour of the traces, the bridge layer, and the insulating island also can reduce the visibility thereof. Additionally, the sensor electrodes, the insulating islands, the bridge layers, and the traces can be formed by multiple deposition processes using a shadow mask. Compared to the use of conventional lithography and etching processes, simple fabrication and low manufacturing cost can be accomplished.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch sensor device, comprising:
   a substrate having a sensing region and a non-sensing region; and
   a plurality of sensor electrodes disposed on a surface of the substrate in the sensing region;
   wherein the plurality of sensor electrodes comprises:
   a first group of sensor electrodes and a second group of sensor electrodes, wherein the first group of sensor electrodes comprises a plurality of first sensor electrodes extending and arranged along a first direction, and wherein the second group of sensor electrodes comprises a plurality of second sensor electrodes extending and arranged along a second direction that is different from the first direction;
   wherein at least one of the plurality of first sensor electrodes and the plurality of second sensor electrodes has a sidewall with a concave-convex contour;
   wherein the concave-convex contour comprises a first convex portion, a second convex portion, and a concave portion between the first convex portion and the second convex portion, and wherein the first convex portion is closer to the surface of the substrate than the second convex portion, and the first convex portion is more outward than the second convex portion.

2. The touch sensor device of claim 1, wherein the plurality of sensor electrodes comprises:
   a plurality of the first groups of sensor electrodes and a plurality of the second groups of sensor electrodes, wherein the plurality of the first groups of sensor electrodes are arranged along the second direction, and the plurality of the second groups of sensor electrodes are arranged along the first direction.

3. The touch sensor device of claim 1, wherein the concave-convex contour is a multi-step contour.

4. The touch sensor device of claim 3, wherein a lateral distance between adjacent steps is in a range of about 2 μm to 10 μm.

5. The touch sensor device of claim 2, further comprising a plurality of traces disposed on the non-sensing region of the substrate, to respectively and electrically connect the plurality of the first groups of sensor electrodes and the plurality of the second groups of sensor electrodes to an exterior circuit, wherein at least one of the plurality of traces has a sidewall with a concave-convex contour.

6. The touch sensor device of claim 2, further comprising a plurality of bridge layers correspondingly connecting adjacent second sensor electrodes in the plurality of the second groups of sensor electrodes, wherein at least one of the plurality of bridge layers has a sidewall with a concave-convex contour.

7. The touch sensor device of claim 1, further comprising a display module to provide a display function for the touch sensor device.

8. The touch sensor device of claim 1, wherein a surface of at least one of the plurality of sensor electrodes has a recess formed thereon.

* * * * *